United States Patent

[11] 3,599,905

| [72] | Inventor | John Sherman Strance<br>Davenport, Iowa |
|---|---|---|
| [21] | Appl. No. | 840,118 |
| [22] | Filed | June 19, 1969 |
| [45] | Patented | Aug. 17, 1971 |
| [73] | Assignee | Gulf & Western Industrial Products Company<br>Grand Rapids, Mich.<br>Continuation-in-part of application Ser. No. 652,518, July 11, 1967, now abandoned. |

[54] SERVOCONTROLLED LAUNCHED OR RECOVERY SYSTEM FOR AIRCRAFT
6 Claims, 3 Drawing Figs.

[52] U.S. Cl............................................................ 244/63
[51] Int. Cl............................................................ B64f 1/04
[50] Field of Search.................................................. 244/63, 110; 188/180; 242/75.5, 75.51, 72.52; 254/173

[56] References Cited
UNITED STATES PATENTS

| 2,978,200 | 4/1961 | Larson et al. | 242/75.51 |
| 3,223,906 | 12/1965 | Dinger | 242/75.51 X |
| 3,414,333 | 12/1968 | Merle | 244/110 X |

FOREIGN PATENTS

| 1,408,183 | 7/1965 | France | 244/110 |
| 1,408,186 | 7/1965 | France | 244/110 |
| 1,439,854 | 4/1966 | France | 244/110 |
| 434,987 | 4/1967 | Switzerland | 244/110 |

Primary Examiner—Milton Buchler
Assistant Examiner—Paul E. Sauberer
Attorney—Meyer, Tilberry and Body ABSTRACT: The disclosure relates to a system for servicing aircraft during launch or recovery operations in which a servocontrol is provided to compare the actual rate of launch or recovery with a predetermined optimum rate which is programmed in accordance with the energy requirements of the particular cycle and continuously adjusts the actual rate to minimize any error between the actual and programmed rates.

INVENTOR.
JOHN S. STRANCE

SERVOCONTROLLED LAUNCHED OR RECOVERY SYSTEM FOR AIRCRAFT

This application is a continuation-in-part of U.S. Pat. Application Ser. No. 652,518, filed July 11, 1967 now abandoned.

The invention is particularly applicable to catapults of the type in which woven textile tape is connected at one end to the aircraft to be launched and is wound upon a reel during the launch at the other end. The reel is driven by a flywheel, the energy of which is transmitted by an hydraulically actuated clutch. Although the invention will be described herein with respect to such a catapult, it will be apparent that it can be used as well in reel-type arresting gear such as disclosed in U.S. Pat. No. 3,309,043 issued Mar. 14, 1967, where the reel is coupled to a brake, instead of a clutch, which retards reel rotation in conformance with a programmed arrestment cycle. Also, the invention is applicable to the launch or recovery of objects other than aircraft such as missiles where a limited period of free flight is desirable before recovery operations commence.

Catapult systems are required to be able to deliver the energy necessary to accelerate the aircraft to a speed at which it can become airborne within the prescribed runway length. Various factors enter into establishing the optimum rate of acceleration of the aircraft and correspondingly, the optimum rate at which hydraulic pressure builds up in the variable engagement type clutch. For example, the actual reel speed can vary considerably from optimum speed during a cycle due to such factors as clutch wear, varying inertias, elasticity changes in the woven textile launching tape an other factors. For a more thorough discussion of some of the effects encountered in using a textile tape, reference is made to U.S. reissue Pat. No. 25,406 issued June 25, 1963. Suffice it to say that as the reel begins to rotate the load comes on the tape very rapidly causing it to stretch. The effect is to store energy in the tape which tends to cause overspeed of the reel as the aircraft picks up momentum. Launch systems in use to date employ programmed cycles which are a function of time and the catapult stroke, however, since there is no feedback data to take into account variables such as tape stretch, optimum performance is not always obtained.

The present invention makes use of a servo-controlled system to provide a programmed catapult stroke with feedback information to compare with the program and make corrections as required to obtain optimum performance.

In accordance with the invention there is provided a servo control having a reference signal which is characteristic of the optimum reel rpm's. Another signal, varying in accordance with actual reel rotation, provides a feedback signal. A comparator compares the reference and feedback signals and provides an magnitude signal. The output signal is a function of the magnitude of error between the reference feedback signal. A variable torque device coupled to the reel is continuously responsive to the output signal to correct reel speed if found deviating from the desired program.

A refinement of the invention is applicable to situations where a relatively large aircraft is to be launched for the size of the flywheel used. Under such circumstances, the flywheel speed will drop rapidly in relation to the increasing speed of the reel so that a clutch lockup may occur before the aircraft is actually launched. Such a condition is detrimental to the proper function of the servo control which is designed to operate with at least some slippage between the flywheel and reel.

In accordance with this aspect of the invention there is a third signal provided which varies as a function of actual flywheel r.p.m.'s. This signal is used to modify the reel feedback signal so that the output signal will always be below a value which would produce a 1:1 drive relationship between the flywheel and reel.

The primary object of the invention is the provision of a self-compensating servocontrol for a launching or recovery system wherein the aircraft speed is accurately controlled in accordance with a predetermined program by providing a feedback signal which is a function of variables in the system at any particular point of the cycle causing the reel speed to be modified in accordance with the program.

Another object is the provision of a servocontrol which includes a cam driven by the reel which provides a programmed reference voltage against which a feedback signal is compared by a differential amplifier providing an output signal for controlling a variable torque means coupled to the reel.

Still another object of the invention is to provide a servocontrol in which a servo valve is responsive to the output signal so as to vary the torque of the clutch or brake which is coupled to the reel by varying the hydraulic pressure applied thereto.

These and other objects and advantages will become apparent from the following description used to illustrate a preferred embodiment of the invention as read in connection with the accompanying drawings in which.

Figure 1:
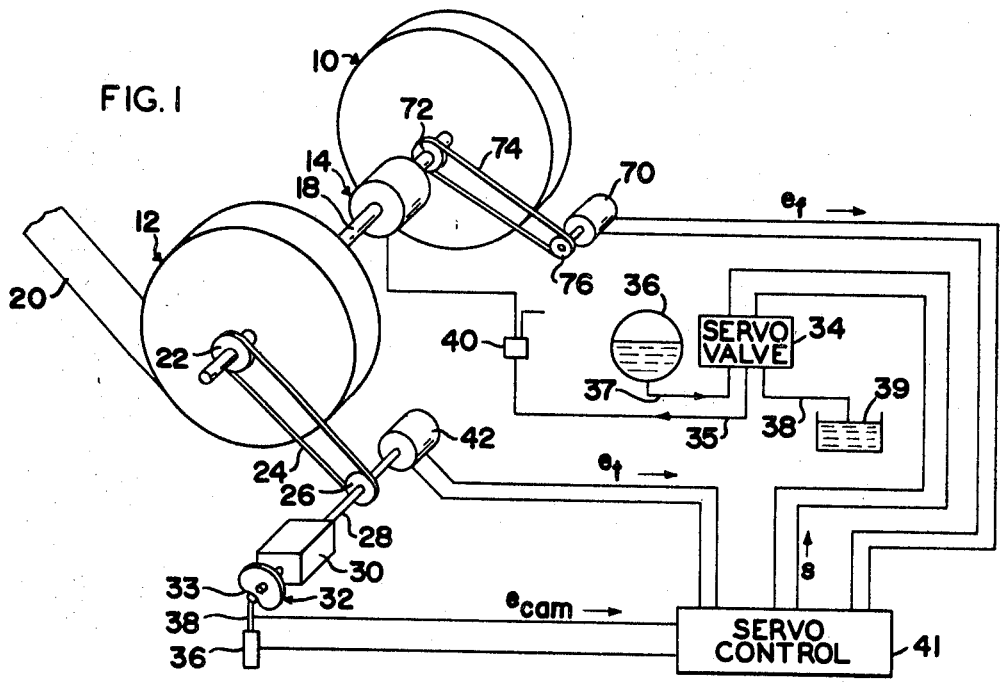
FIG. 1 is a schematic view of a flywheel energized catapult incorporating a servocontrol in accordance with the invention and including the modification of a flywheel feedback signal.

Referring to the drawings which illustrate a preferred embodiment of the invention only and are not for the purpose of limiting same, FIG. 1 shows a catapult including a flywheel 10, a reel 12 and a clutch 14 coupling the two on a shaft 18. A textile tape 20 is wound on the reel 12 and is adapted to have one end connected to an aircraft (not shown). As is known practice, the flywheel 10 is brought up to speed thereby storing sufficient energy so that when the clutch 14 is engaged, the reel 12 will accelerate winding in the tape 20 at a rate which is determined sufficient to insure that the aircraft becomes airborne within the prescribed runway or stroke length. After launch the clutch 14 is disengaged and the reel is braked to a stop in a known manner. The clutch 14 is variably actuated by varying the hydraulic pressure thereto.

THE HYDRAULIC SYSTEM

Mounted on the shaft 18 is sprocket 22 which drives a chain 24 that in turn drives a sprocket 26 mounted on a counter shaft 28. The counter shaft 28 is connected to a gearbox 30 driving a control cam 32 having a cam face 33.

A servo valve 34 supplies a variable hydraulic pressure to the clutch 14 through a servo valve discharge line 35. An accumulator 36 supplies pressure to the valve through line 37. A bleed line 38 dumps the servo valve 34 to a bleed sump 39 at the end of the launch. A two-way valve 40 allows the pressure on the clutch 14 to be bled at the end of a launch cycle.

The cam rotates in proportion to reel rotation and as described hereinafter, through a servo control 41, controls the servo valve 34 to establish the optimum rate at which hydraulic pressure builds up in the clutch 14 during reel acceleration. The launch program is dictated by the profile of cam face 33.

THE SERVO CONTROL

In accordance with the invention, the servo system provides a program by which the catapult stroke is continuously adjusted in accordance with feedback information from the reel which is compared with the cam program and, if required, makes corrections in reel speed to achieve optimum performance. A reel tachometer generator 42 provides a tachometer feedback voltage $e_t$ which acts as a feedback signal adjusted by a tachometer potentiometer 44 (FIG. 2) before being fed into an error detector 45 such as a differential amplifier which is located in the servocontrol unit 41. The cam 32 through the follower 38 and a cam potentiometer 36 provides a programmed cam voltage $e_{cam}$ which is a reference voltage for the system and is fed into the error detector 45. The cam voltage $e_{cam}$ is modified before entering the error detector by an initial voltage $e_i$ (FIG. 2) which is provided through a variable potentiometer 46 which adjusts the value of the initial voltage to the desired value. The sum of $e_{cam}$ and $e_i$ equals $e_{net}$, which voltage is impressed on the error detector 45. The output of the error detector 45 is an error voltage $e_e$ which is the difference between $e_{net}$ and $e_t$. This error voltage $e_e$ is fed to a servo valve amplifier 47 where it is amplified by an electrical gain $e_g$ applied to the amplifier through a gain potentiometer 48 and a cam-actuated rotary electrical gain potentiometer 49. The electrical gain $e_g$ varies as a function of reel turns inasmuch as the gain potentiometer 49 is connected to the cam 32 by means of a known rotary drive and follower mechanism represented by dash line 50 which is set to operate when 15 reel turns have elapsed. An actuating output signal S from the servo valve amplifier 47 is fed to the servo valve 34 which controls the hydraulic output pressure in line 35 to the clutch 14.

OPERATION

Figure 2:
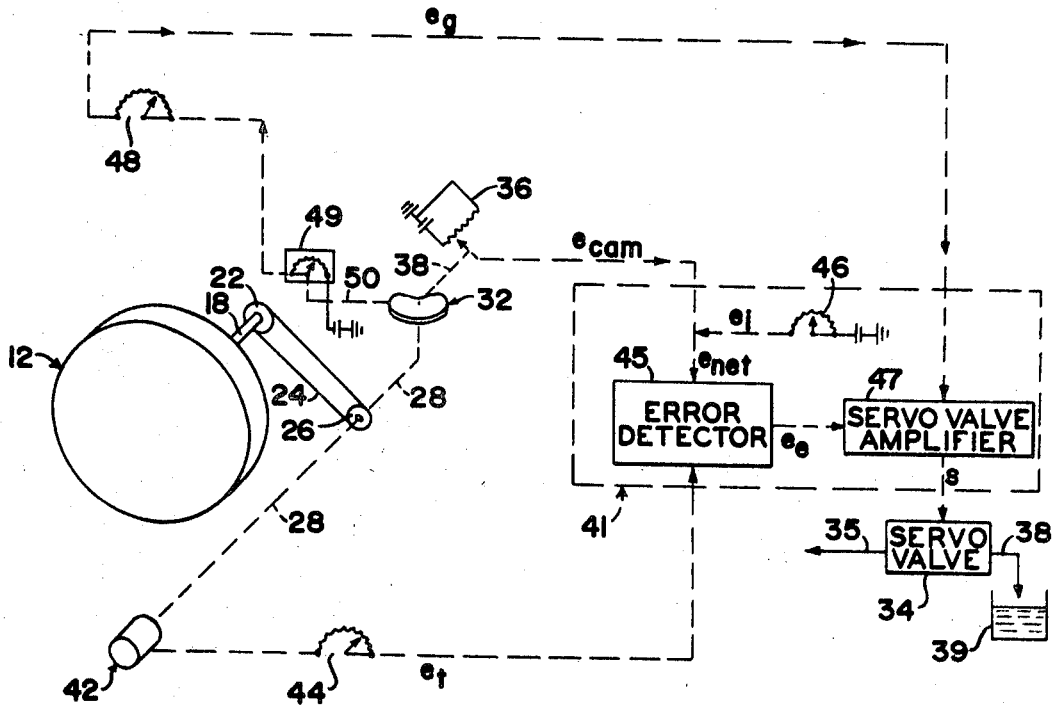
FIG. 2 is a partial electrical schematic showing the components of the servocontrol.
Figure 3:
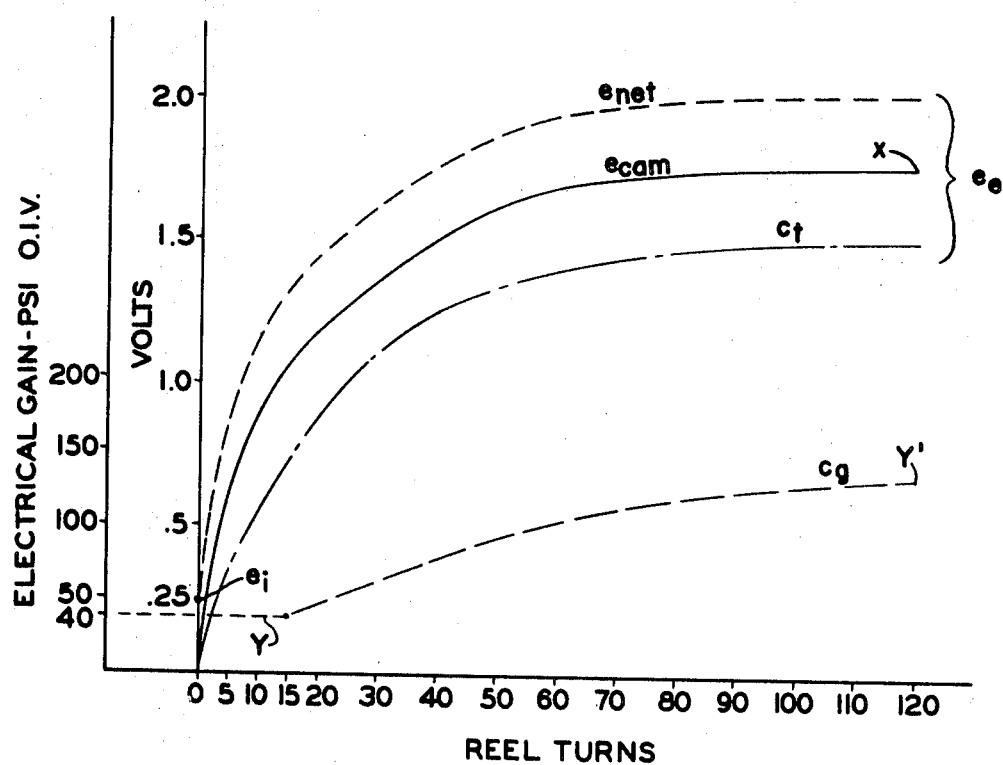
FIG. 3 is a diagram of curves of various control parameters for a typical launch cycle.

The operation of the servo control system can best be understood by referring to the family of curves shown in FIG. 3 which represent a typical launch cycle for the flywheel-reel catapult shown in FIGS. 1—2. The four basic parameters of the system are plotted as curves $e_g$ (electrical gain), $e_t$ (tachometer feedback voltage), $e_{cam}$ (cam reference voltage) and $e_{net}$ (net voltage). The abscissa for all the curves is plotted as reel turns elapsed from the beginning of a launch to the end of a launch at 120 reel turns. The ordinate scale for curves $e_{net}$, $e_{cam}$ and $e_t$ is plotted as volts while the ordinate scale for $e_g$ is plotted in units of pounds per square inch (clutch hydraulic pressure per 0.1 volts).

The cam voltage curve $e_{cam}$ establishes the programmed reference voltage for the servo control 41 and its profile is dictated by the cam face contour 33 of the cam 32. The cam potentiometer 36 generates the cam voltage curve $e_{cam}$ in accordance with the elapsed reel turns.

The net voltage curve $e_{net}$ is the electrical summation of the cam voltage $e_{cam}$ and an initial voltage $e_i$ which, in this particular launch, has been set at 0.25 volts. The initial voltage $e_i$ has not been plotted since it is constant throughout the cycle. The net voltage curve will therefore duplicate the profile of the cam voltage curve $e_{cam}$. The initial voltage $e_i$ is impressed upon the cam voltage $e_{cam}$ to initiate the launch since without this voltage no error voltage would be available to impress upon the servo control 41.

The tachometer feedback voltage curve $e_t$ is a function of reel r.p.m.'s for any particular point of the launch cycle by virtue of the tachometer generator 42 which generates a voltage directly proportional to the speed of the reel. The output of the generator 42 is regulated to provide a voltage output of 0.1 volts per 55 r.p.m.'s of the reel.

The difference between $e_{net}$ and $e_t$ is the error or output signal $e_e$, as indicated in FIG. 3. A change in $e_e$ is used to control the opening or closing of the servo valve 34. Throughout the entire cycle there must be an error voltage $e_e$ in order that there be a clutch engagement. The servo valve will null if the magnitude of $e_e$ remains constant i.e., $e_e$ approaches zero.

The electrical gain $e_g$ is an amplification factor which when fed into the servo valve amplifier 47 determines the magnitude of the actuating signal S to the servo valve 34 thereby determining the clutch pressure. The clutch pressure is the product of error voltage $e_e$ and the varying electrical gain $e_g$ at any point during the cycle and therefore it can be appreciated that the higher the electrical gain $e_g$ the higher the resulting clutch pressure. In this particular launch the electrical gain $e_g$ has an initial value y of 40 p.s.i./0.1 volts, which means that for every 0.1 volts of error voltage $e_e$, there will be impressed upon the clutch an hydraulic pressure of 40 p.s.i. After 15 reel turns have elapsed, through the rotary potentiometer 49, the electrical gain $e_g$ is increased as shown by curve $e_g$ until the end gain setting Y' at the end of the launch is reached. At the end of a launch a small error voltage $e_e$ will result in a large increase in clutch pressure due to the fact that the electrical gain setting Y' is much larger than the initial gain setting Y. A large amplification factor is desirable at the end of the launch in order to result in a final accurately controlled reel speed.

The curve $e_t$ indicates an optimum feedback voltage that would correspond to an ideal launch. If the reel r.p.m.'s should deviate from the prescribed program, the voltage $e_t$ will deviate also thereby causing a deviation in the error voltage from the programmed error voltage $e_{net}$.

During a typical launch, the system operates as follows: at the commencement of the launch the electrical gain $e_g$ is set at its initial value Y of 40 p.s.i./0.10 volts by the potentiometer 49 and it remains at this value until 15 reel turns have (FIG. 3). The initial voltage $e_i$ is set at its initial value of 0.25 volts by the potentiometer 46. Since the tachometer voltage $e_t$ and the cam voltage $e_{cam}$ at this point of the cycle are zero, the error signal $e_e$ fed into the servo valve amplifier 47 is equivalent to $e_i$. Electrical gain $e_g$ of 40 p.s.i./0.1 volts is fed into the servo valve amplifier 49 which amplifies the error signal $e_e$ (at this point 0.25 volts) to provide the initial actuating signal S to the servo valve 34, opening it up to provide hydraulic pressure of 100 p.s.i. (40 p.s.i. ×0.25 /0.1 ) through line 35 to the hydraulic clutch 14 thereby providing torque between the flywheel 10 and the reel 12 that starts the reel turning. After 15 reel turns have elapsed, the rotary cam drive 50 for the gain potentiometer 49 causes the electrical gain $e_g$ to vary, as shown in FIG. 3, as a function of reel turns, and thereby vary the amplification of the error signal output S. As the launch progresses the reel tachometer generator 42 provides the tachometer feedback voltage $e_t$ and the cam 32 through the follower 38 and potentiometer 36 provides the reference cam signal $e_{cam}$. The $e_{net}$ voltage which is the sum of $e_{cam}$ and $e_i$ is compared to the feedback from the reel $e_t$ in the error detector 45 which in turn provides the error output signal $e_e$. The error voltage $e_e$ rapidly changes in magnitude thereby causing a relatively rapid movement of the servo valve 34. As the launch progresses, the error voltage $e_e$ remains relatively constant causing the servo valve to null. However, if the r.p.m. of the reel is less than what it should be at that particular portion of the cycle, the error voltage $e_e$ increases causing the servo valve to open up more thereby increasing the hydraulic clutch pressure and thereby increasing the speed of the reel. The increased speed of the reel causes a higher generator tachometer voltage $e_t$ to be generated thereby reducing the error voltage $e_e$ to its programmed value.

At the end of the launch, the end electrical gain (Y' on curve $e_g$) is approximately 140 p.s.i./0.1 volts and the end error voltage $e_e$ is approximately 0.5 volts. Since the clutch pressure is the product of electrical gain $e_g$ and error voltage $e_e$, the resulting final clutch pressure is 700 p.s.i. (140×0.5/ 0.1 ).

THE MODIFICATION

As a modification to this control system, reference is made to FIG. 1 again showing a flywheel tachometer generator 70 driven by a driver pulley 72 mounted on the shaft 18. A belt 74 drives a pulley 76 on the generator 70. Electrical leads provide an output voltage signal $e_f$ from generator 70 to the servocontrol 41 which varies as a function of actual flywheel speed.

In launching relatively large aircraft with small flywheels, the flywheel speed will drop off more rapidly and approach the reel speed during the launch which would cause a 1:1 speed ratio or a lockup between the flywheel and the reel. This condition is to be avoided since the servo system is designed to function properly when there is at least some slippage between the flywheel and the reel. The signal $e_f$ is adjusted so as to generate a voltage which is a function of approximately 95 percent of the actual flywheel speed. The flywheel tachometer 70 provides the signal $e_f$, which when added to the output of the reel tachometer generator $e_t$ modifies the error voltage $e_e$ in relation to the cam voltage curve cam so that it will never be so large as to cause a lockup. Ordinarily the control system will work properly without the use of the flywheel generator, since the flywheels in use are of such a size that a speed ratio of 1:1 is not ordinarily reached.

In accordance with the present invention, the velocity of an aircraft being launched will be at a desirable value at any point in time during a launching cycle. It will be recognized, that the reel driven cam, which provides a progressively increasing signal, provides a signal which is proportional to the desired aircraft velocity at any given point in time. In addition, the reel driven tachometer provides a signal which is proportional to the actual velocity of the aircraft at any given point in time and this signal is compared with the desired velocity. While these parameters of aircraft velocity are measured in accordance with a preferred embodiment by counting reel revolutions and measuring reel velocity, it will be recognized that it is possible to drive both cam 32 and tachometer 42 through a rotatable sheave engaging tape 20. . That is, it is possible to measure the linear velocity of tape 20 by use of tachometer 42 and to measure the length of tape wound upon reel 12 by using cam 32. Actually, counting reel revolutions and reel velocity is simply another way of proportionately measuring the linear velocity of tape 20 and its length which has been wound upon reel 12. In aircraft launch devices, tape 20 is commonly connected with a shuttle which is connectable with an aircraft. Reel 12 is then rotated to coil tape 20 thereon and pull the sheave down the runway. In such devices, it is conventional to have a trailing cable connected to the sheave and to a separate drum. In such arrangements, completion of a launch permits one to reset the system by coiling the trailing cable on its own reel to pull the shuttle back to a prelaunch position and to uncoil tape 20 from reel 12. Those skilled in the art will recognize that it is also possible to use tachometer 42 and cam 32 in combination with such a trailing cable as measuring the linear velocity of the trailing cable and its length of displacement is simply another way of determining aircraft velocity at any given point in time. Likewise, it is possible to measure the angular velocity and reel turns of the reel on which the trailing cable is wound. The important fact is, that the present apparatus includes means for providing a variable reference signal which varies in accordance with the position of an aircraft on the runway and is proportional position of the aircraft relative to the apparatus, and further includes means for providing a feedback signal which corresponds to the velocity of the aircraft at a given point in time. The position of the aircraft on a runway, and its velocity at any given point in time, is determined by signalling devices connected with the apparatus of the present invention.

As previously mentioned, the apparatus of the present invention is useful for assisting aircraft either during launching or recovery operations. In using the apparatus of the present invention as an aircraft-arresting device, it is obvious that the signal devices operate in a reverse manner from their operation during a launching cycle. That is, during an arresting operation, cam 32 cooperates with variable potentiometer 36 to produce a progressively decreasing voltage signal which is sent to error detector 45. Likewise, the braking effect upon reel 12 during an arresting operation causes tachometer 42 to produce a progessively decreasing voltage signal. During an arresting operation, the progressively decreasing voltage signal sent by cam 32 and potentiometer 36 is compared with the voltage signal sent from tachometer 42. If the voltage signal sent tachometer 42 is above the voltage signal sent by cam 32 and potentiometer 36 at any given point in time, servo valve amplifier 47 cooperates with servo valve 34 to send a signal to a hydraulic braking device to increase its engagement and slow down rotation of reel 12 so that the signals sent by cam 32 and tachometer 42 will be balanced. As in a launching operation, it will be recognized by those skilled in the art that cam 32 and tachometer 42 may be driven by a rotatable sheave engaging the arresting tape during an arresting operation. That is, driving cam 32 and tachometer 42 through the reel during an arrestment operation is simply one way of measuring the linear velocity of the tape being uncoiled from reel 12 and the length of tape which has been uncoiled from reel 12. In addition, either of these ways is simply characteristic of the present apparatus which constantly measures the velocity of an aircraft being arrested and compares such velocity with a predetermined desired velocity at any given aircraft position. With the present apparatus, the signalling devices are driven by the apparatus itself and provide signals to aircraft velocity and aircraft position at any given point in time. During an arresting operation, it will be recognized that it is also possible to arrange cam 32 and potentiometer 36 in such a manner that a substantially constant voltage signal is sent over a major portion of an arresting cycle. With such an arrangement, the substantially constant voltage signal sent over the major portion of the cycle will force tachometer 42 to be operated so it also sends a substantially constant voltage signal to be balanced in error detector 45. With such an arrangement, the braking force applied to reel 12 will be maintained in such a fashion that reel 12 rotates at a substantially constant angular velocity over a major portion of the arresting cycle. Once the major portion of the arresting cycle is over, cam 32 would cooperate with potentiometer 36 to decrease the constant voltage signal at a progressive rate so that reel 12 would have to be slowed down further in order to balance the voltage signal from tachometer 42. This would insure maximum brake engaging force during the terminal portion of an arresting cycle. Unlike a launching operation, an arresting operation does not require a voltage source $e_i$ to start the apparatus operating. In an arresting operation, a landing aircraft would simply engage a payout device to start reel 12 rotating. Cam 32 would then cooperate with potentiometer 36 to send a reference signal and tachometer 42 would send a feedback signal for operating the brake in a controlled manner. This is a desirable feature because the brake is not engaged until the system is in operation. Likewise, the gain device may be eliminated in an arresting condition or may produce a constant gain signal merely for the purpose of amplifying the error signal from potentiometer 36 and tachometer 42.

While the invention has been described with reference to a preferred embodiment, it is obvious that modifications and alterations will occur to others upon the reading and understanding of this specification.

I claim:

1. In a system for assisting aircraft during at least one of two functions including a launch cycle function and a landing cycle function on a restricted runway,
    a reel having a predetermined number of revolutions for one of said cycle functions,
    an elongated coilable element releasably connected with an aircraft, said coilable element being adapted to be reeled upon said reel during a launch cycle function and paid out therefrom during a landing cycle function,
    a voltage generator driven by said reel and providing a feedback voltage signal characteristic of actual reel speed,
    a control cam also driven by said reel,
    another voltage generator responsive to cam rotation to provide a reference signal establishing an optimum rate of reel rotation in accordance with the cam profile,
    servocontrol means for comparing the feedback signal with the reference signal and delivering an output voltage signal reflecting any deviation from the difference between the two in accordance with a predetermined programmed difference, and
    variable torque means coupled to the reel responsive to the output voltage for establishing the optimum rate of reel rotation in accordance with the programmed difference.

2. Aircraft launching apparatus comprising; rotatable reel means, power means for rotating said reel, variable torque transmitting means coupling said power means with said reel means, elongated coilable means windable on said reel means when said reel is rotated by said power means, aircraft towing means connected with said coilable means for movement in a substantially linear path when said coilable means is wound upon said reel, control means for controlling said variable torque transmitting means to vary the amount of torque transmitted from said power means to vary the amount of torque transmitted from said power means to said reel means, said control means including predetermined program means for providing a variable reference signal which varies in accordance with the length of said coilable means on said reel means, and signal comparing and sending means for comparing said reference and feedback signals and sending a control signal for controlling said variable torque transmitting means to transmit torque from said power means to said reel means and vary the rotational speed of said reel means for balancing said reference and feedback signals as said reference signal varies in accordance with the length of said coilable means coiled upon said reel means.

3. The apparatus of claim 2 and further including variable power signal means for providing a variable power signal in accordance with the rotational rate of said power means, said signal comparing and sending means comparing said reference, feedback and power signals and sending a control signal for controlling said variable torque transmitting means.

4. A method of launching an aircraft by rotating a reel with variable torque power means to wind elongated aircraft towing means upon said reel comprising the steps of: continuously comparing the winding rate of said towing means upon said reel with predetermined reference means proportional to the length of said towing means wound upon said reel means, measuring the difference between the winding rate of said towing means upon said reel means and said predetermined reference means, and varying said variable torque power 5. Apparatus of the class described comprising: a rotatable reel, an elongated coilable element adapted to be coiled upon said reel when said reel is rotated in a coiling direction to launch an aircraft, flywheel means for rotatably driving said reel in said coiling direction, variable torque means for coupling said flywheel to said reel to control reel r.p.m.'s in said coiling direction in accordance with an optimum variable rate of reel rotation, said variable torque means comprising hydraulically actuated clutch means, a servocontrol system for regulating said variable torque means, said control system including reference signal means providing a variable reference signal characteristic of a predetermined program establishing an optimum variable rate of reel rotation, reel feedback signal means driven by said reel for providing a reel feedback signal which is a function of actual reel speed, and comparing means for comparing said reference and feedback signals and providing an output signal for regulating said variable torque means to maintain rotation of said reel in accordance with said predetermined program.

6. The device of claim 5 and further including flywheel feedback signal means driven by said flywheel for providing a flywheel feedback signal which is a function of actual flywheel r.p.m.'s, said flywheel feedback signal modifying said reel feedback signal so that said output signal from said comparing mean is a function of both reel feedback signals and flywheel feedback signals and is adjusted to prevent lockup of said hydraulically actuated clutch.